(12) United States Patent
Yousef

(10) Patent No.: US 7,940,865 B2
(45) Date of Patent: May 10, 2011

(54) RE-ACQUISITION OF SYMBOL INDEX IN THE PRESENCE OF SLEEP TIMER ERRORS FOR MOBILE MULTIMEDIA MULTICAST SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 615 days.

(21) Appl. No.: 12/062,712

(22) Filed: Apr. 4, 2008

(65) Prior Publication Data
US 2009/0252238 A1   Oct. 8, 2009

(51) Int. Cl.
*H04L 27/06* (2006.01)
(52) U.S. Cl. ..................... 375/342; 340/10.33
(58) Field of Classification Search .......... 375/259–260, 375/316, 342, 377; 370/203, 206; 340/10.33, 340/539.3
See application file for complete search history.

(56) References Cited

U.S. PATENT DOCUMENTS

| | | | |
|---|---|---|---|
| 7,720,027 B2* | 5/2010 | Ling et al. | 370/328 |
| 2007/0060095 A1* | 3/2007 | Subrahmanya et al. | 455/343.1 |
| 2007/0116051 A1* | 5/2007 | Chen | 370/469 |
| 2008/0107192 A1* | 5/2008 | Mukkavilli et al. | 375/260 |

* cited by examiner

*Primary Examiner* — Jean B Corrielus
(74) *Attorney, Agent, or Firm* — Rahman LLC

(57) ABSTRACT

A technique for re-acquiring a symbol index in the presence of sleep timer errors in a MediaFLO™ (Forward Link Only) mobile multimedia multicast system comprising a receiver and a transmitter, wherein the method comprises receiving a digital signal comprising a superframe comprising one or more Orthogonal Frequency Division Multiplexing (OFDM) symbols in the receiver comprising a timer; waking up the receiver from a sleep mode of operation by an amount of time equal to a maximum error introduced by the timer plus a time to reacquire a beginning of each OFDM symbol plus a time to reacquire a symbol index; and reacquiring the symbol index.

20 Claims, 7 Drawing Sheets

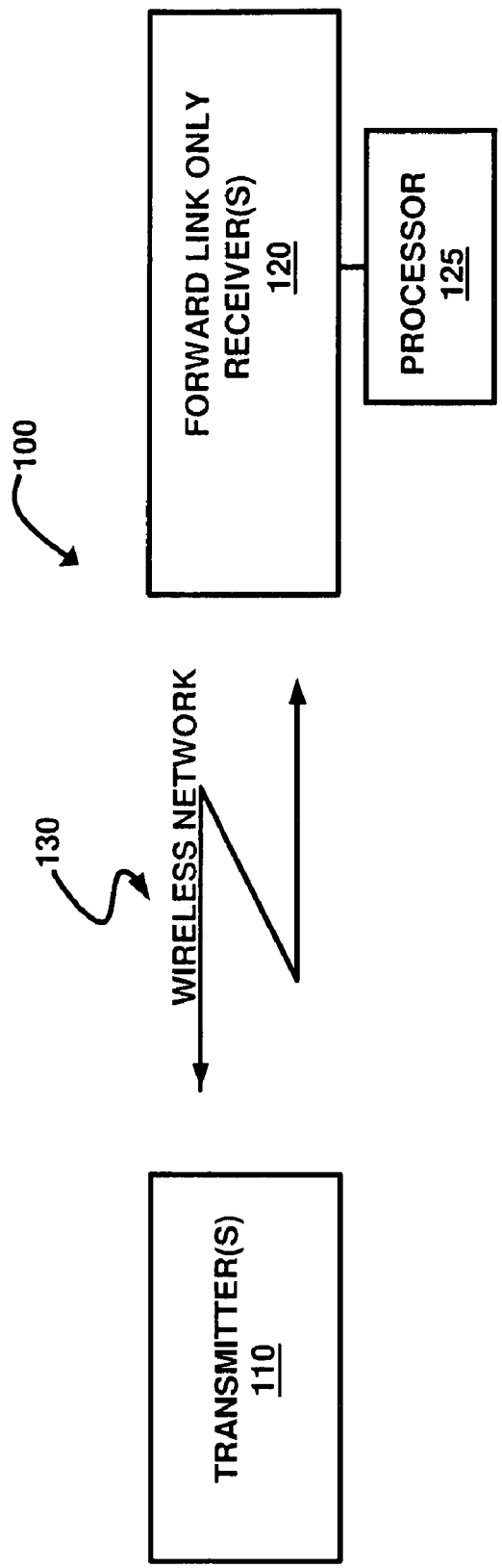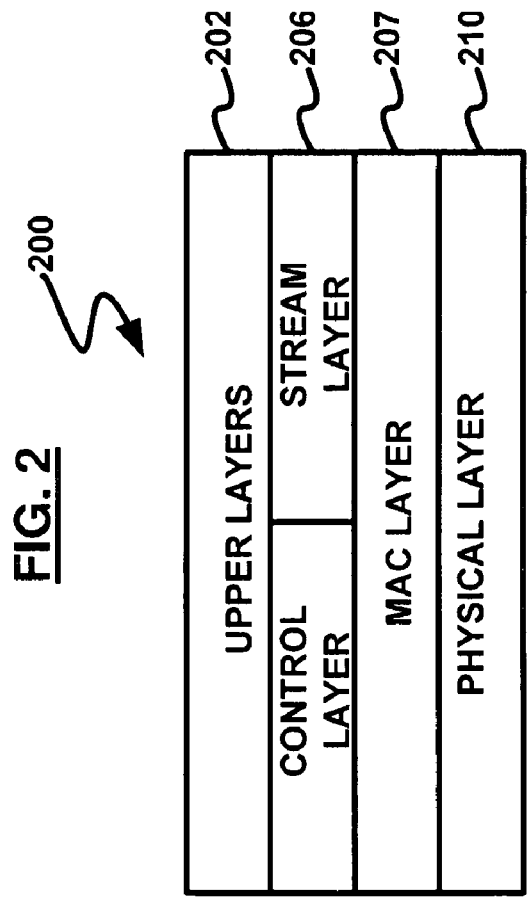

RE-ACQUISITION OF SYMBOL INDEX IN THE PRESENCE OF SLEEP TIMER ERRORS FOR MOBILE MULTIMEDIA MULTICAST SYSTEMS

BACKGROUND

1. Technical Field

The embodiments herein generally relate to wireless communications, and, more particularly, to re-acquisition of a symbol index in a MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data.

SUMMARY

In view of the foregoing, an embodiment herein provides a method for re-acquiring a symbol index in presence of sleep timer errors in a MediaFLO™ (Forward Link Only) mobile multimedia multicast system, and a program storage device readable by computer, tangibly embodying a program of instructions executable by the computer to perform the method for re-acquiring a symbol index in a presence of sleep timer errors in a MediaFLO™ mobile multimedia multicast system, wherein the method comprises receiving a digital signal comprising a superframe comprising one or more Orthogonal Frequency Division Multiplexing (OFDM) symbols in the receiver comprising a timer; waking up the receiver from a sleep mode of operation by an amount of time equal to a maximum error introduced by the timer plus a time to reacquire a beginning of each OFDM symbol plus a time to reacquire a symbol index; and reacquiring the symbol index.

The method may further comprise setting an index search space; setting a first index in the index search space as the symbol index; generating a local copy of Frequency Division Multiplexing (FDM) pilots that belong to a received symbol depending on the symbol index and whether the OFDM belongs to wide area or local area symbols; dividing the FDM pilots of the received symbol by the local copy of the FDM pilots; computing an Inverse Fast Fourier Transform (IFFT) process of the result of the division process to get a time-domain channel estimate; and computing a sparseness index for each the time-domain channel estimate of the plurality of OFDM symbols. Moreover, the method may further comprise determining whether an index value is positioned last in the index search space. Additionally, the method may further comprise setting a second value in the search space as the index value. Also, the method may further comprise obtaining an OFDM symbol number of an index having a maximum sparseness value. Preferably, the OFDM symbol number alerts the receiver to wake up when a required Multicast Logical Channel (MLC) arrives in the receiver. Furthermore, the superframe preferably comprises an Overhead Information System (OIS) channel, a Multicast Logical Channel (MLC), and multiple FDM pilots. Moreover, the plurality of symbols may comprise FDM pilots.

Another embodiment includes an apparatus for re-acquiring a symbol index in a presence of sleep timer errors in a MediaFLO™ (Forward Link Only) mobile multimedia multicast system, wherein the apparatus comprises a receiver that is in a sleep mode of operation and adapted to receive a digital signal comprising a superframe comprising a plurality of Orthogonal Frequency Division Multiplexing (OFDM) symbols, wherein said receiver comprises a timer; and a processor adapted to (i) wake up said receiver from said sleep mode of operation by an amount of time equal to a maximum error introduced by said timer plus a time to reacquire a beginning of each OFDM symbol plus a time to reacquire a symbol index; and (ii) reacquire said symbol index. A further embodiment includes a program storage device readable by computer, tangibly embodying a program of instructions executable by said computer to perform a method for re-acquiring a symbol index in a presence of sleep timer errors in a Media-FLO™ (Forward Link Only) mobile multimedia multicast system.

The processor may be further adapted to set an index search space; set a first index in the index search space as the symbol index; generate a local copy of FDM pilots that belong to a received symbol depending on the symbol index and whether the OFDM belongs to wide area or local area symbols; divide the FDM pilots of the received symbol by the local copy of the FDM pilots; compute an IFFT process of the result of the division process to get a time-domain channel estimate; and compute a sparseness index for each the time-domain channel estimate of the plurality of OFDM symbols. Also, the processor may be further adapted to determine whether an index value is positioned last in the index search space. Additionally, the processor may be further adapted to set a second value in the search space as the index value. Moreover, the receiver may be further adapted to obtain an OFDM symbol number of an index having a maximum sparseness value. Furthermore, the OFDM symbol number preferably alerts the receiver to wake up when a required Multicast Logical Channel (MLC) arrives in the receiver. Preferably, the superframe comprises an OIS channel, a MLC, and multiple FDM pilots. Moreover, the plurality of symbols may comprise FDM pilots.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

These and other features, benefits and advantages of the present invention will become apparent by reference to the following text figures, with like reference numbers referring to like structures across the views, wherein:

FIG. 1 illustrates a FLO system for a MediaFLO™ system according to an embodiment herein;

FIG. 2 illustrates a layering architecture for an air interface of a FLO system according to an embodiment herein;

DETAILED DESCRIPTION OF PREFERRED EMBODIMENTS

Figure 3:
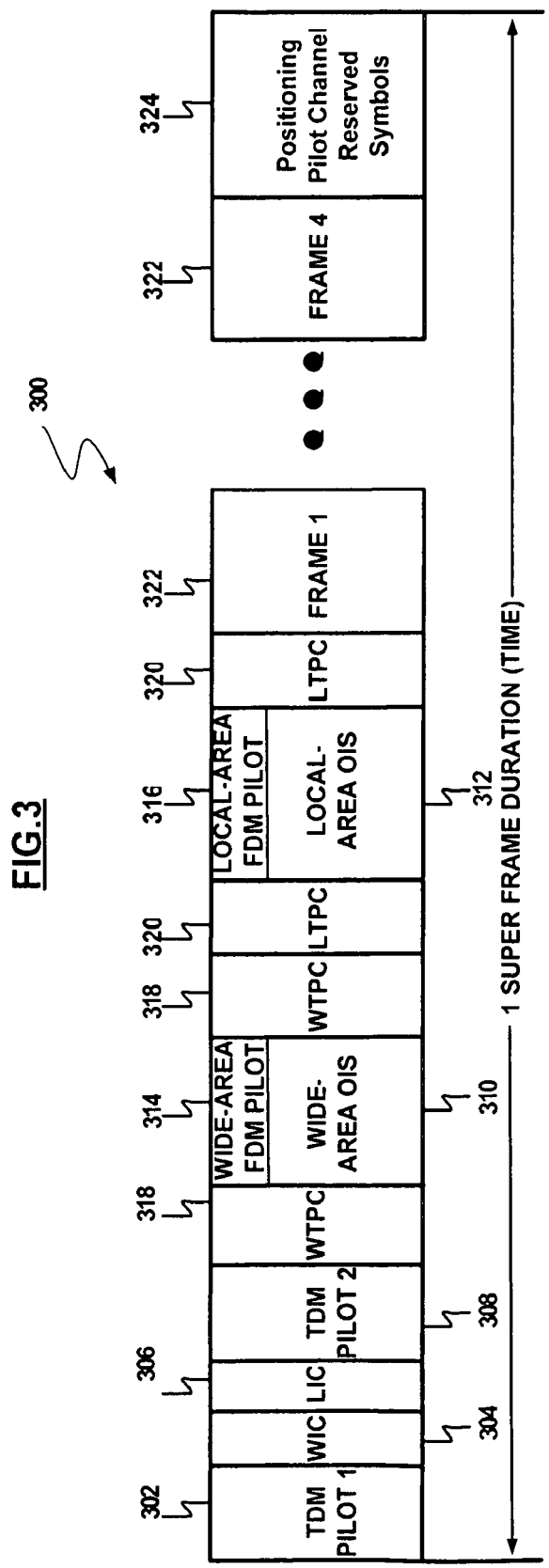
FIG. 3 illustrates a FLO superframe structure for a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments provide an efficient technique of timing and frequency acquisition form the received superframes. Referring now to the drawings, and more particularly to FIGS. 1 through 8, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120. A processor 125 receives and processes the symbol streams received by the receiver 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T). To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest. The data rates required by the services are expected to vary over a wide range, depending on their multimedia content. Thus, effective use of statistical multiplexing can significantly increase the number of services supported by a multicast system using a specified channel bandwidth.

FIG. 2 illustrates a layering architecture 200 for an air interface of a FLO system. The air interface is layered with the interface defined for each layer. The layers are as follows:

The upper layers 202 provide multiple functions including compression of multimedia content, access control to multimedia, and content and formatting of control information. The Medium Access Control (MAC) layer 207 controls access to the physical layer 210, performs the mapping between logical channels and physical channels, multiplexes logical channels for transmission over the physical channel, de-multiplexes the logical channels at the mobile device, and enforces Quality of service (QOS) requirements.

The stream layer (and accompanying control layer) 206 provides binding of the upper layers 202 packets to streams of each logical channels and packetization residual error handling functions. The physical layer 210 provides channel structure for the forward link and defines frequency, modulation, and encoding requirements.

At each transmitter 110 of FIG. 1, the transmitted MLCs of the FLO system 100 of FIG. 1 are organized as superframes. In an embodiment, a superframe is of one second duration and comprises 1200 OFDM symbols of 0.833 ms duration each. In an embodiment, each superframe comprises 1200 OFDM symbols per MHz of allocated bandwidth, as each of the OFDM symbol is of 0.833 ms duration.

FIG. 3 illustrates a FLO superframe structure 300 for a MediaFLO™ system. The transmission and reception in the FLO system are based on using 4096 (4K) subcarriers. The selection of 4096 subcarriers in FLO provides superior mobile performance compared to 2048 (2K) and 8192 (8K) subcarriers. Of the 4096 subcarriers, 96 are unused and referred to as guard subcarriers. The remaining 4000 subcarriers are referred to as active subcarriers, which are modulated by data or pilot symbols. In an embodiment, these 4000 active subcarriers are further equally divided into eight disjoint groups called interlaces. One interlace from the group is assigned to the Frequency Division Multiplexing (FDM) pilot and is used for channel estimation. The remaining seven interlaces are available for modulation with data symbols. The pilot and data subcarriers are modulated with symbols that have the same energy in the FLO system. These interlaces are allocated to MLC(s) and enable frequency-division multiplexing. Since, the subcarriers within an interlace span the total FLO signal bandwidth there is no loss of frequency diversity.

Forward error correction and coding can also be used to gain the benefit of OFDM over time/frequency-selective channels. In an embodiment, the FLO design uses a concatenated coding scheme, comprising of an outer Reed Solomon (RS) code and an inner Parallel Concatenated Convolution code (PCCC), also called as a turbo code. As illustrated in FIG. 3, a superframe is divided into Time Division Multiplexed (TDM) pilot OFDM symbols, frequency division multiplexed (FDM) pilot channel with Overhead Information symbols (OIS) channel, Transition Pilot Channels (TPC) symbols 318, 320, data channels 322, and Positioning Pilot Channel (PPC) 324. There are four TDM pilot OFDM symbols namely TDM pilot 1 (TDM1) 302, Wide-area Identification Channel (WIC) 304, Local-area Identification Channel (LIC) 306, and TDM pilot 2 (TDM2) 308.

The OIS channel is divided into two sections namely the Wide-area OIS channel 310, and Local-area OIS channel 312, each comprising five OFDM symbols that carry overhead information. The Wide-area OIS channel 310 contains information about those MLCs that are common to the wide area, while the Local-area OIS channel 312 contains information about those MLCs that are common to specific local coverage areas.

Similar to the OIS channel, a FDM pilot channel is divided into two sections namely the Wide-area FDM pilot channel 314 and the Local-area FDM pilot channel 316. The TPCs 318, 320 are symbols flanking each continuous portion of the Local-area OIS 312, Wide-area OIS 310, Local-area data frames and Wide-area data frames. The TPC symbols 318, 320 are used to assist channel estimation for demodulation of the data OFDM symbol adjacent to them.

The four data channels 322 occupy a substantial portion of the superframe 300 and carry the multicast multimedia information to the FLO receivers 120 FIG. 1. The PPC 324 forms the last portion of a superframe 300 and comprises 2, 6, 10, or 14 OFDM symbols. The PPC symbol 324 is unique for each transmitter 110 of FIG. 1 and in an embodiment, is used for transmitter identification. In an embodiment the PPC is used for position location of the receiving device using triangulation methods.

Figure 4:
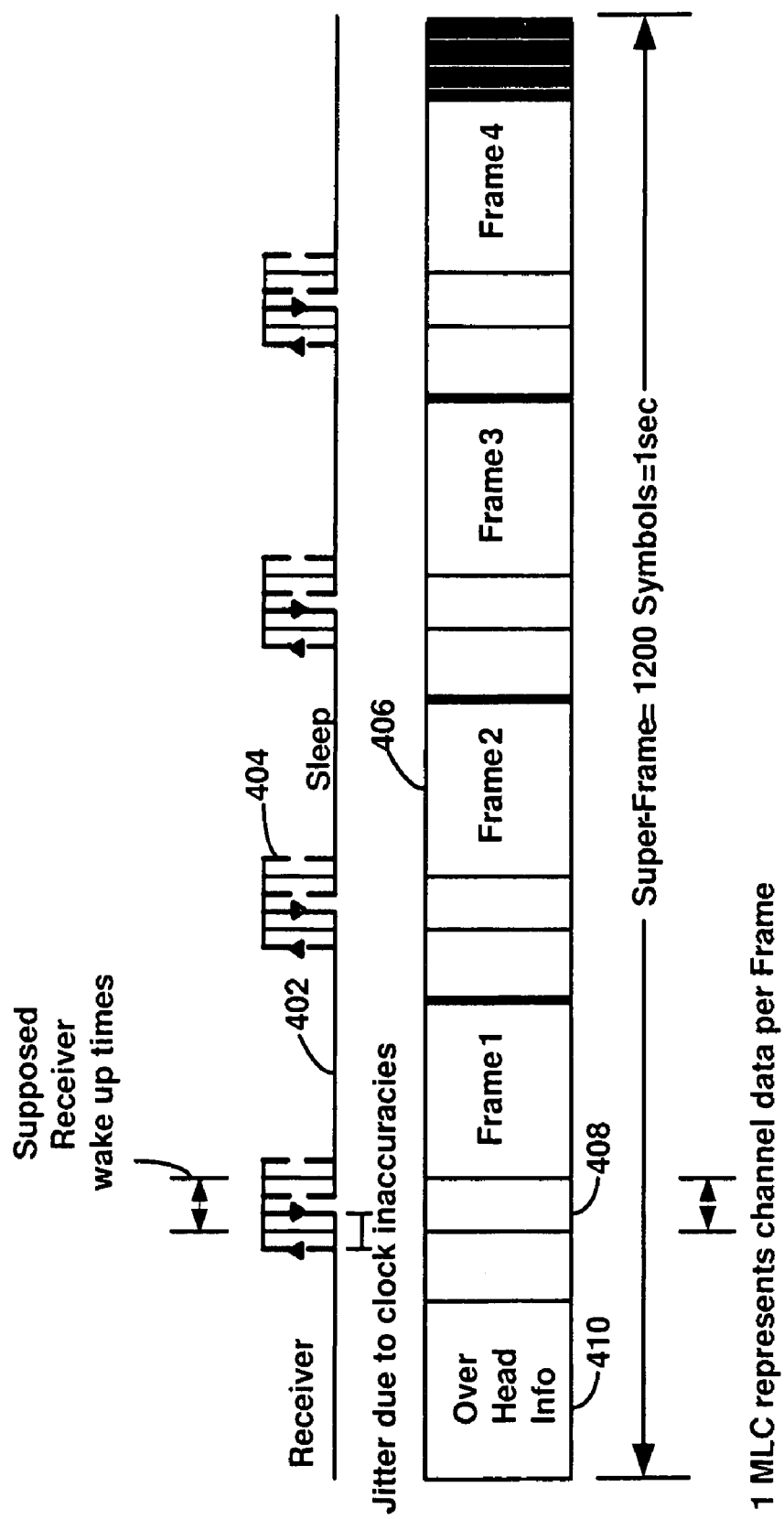
FIG. 4 illustrates reception of superframes in a receiver used in accordance with an embodiment herein.

FIG. 4 illustrates the reception of superframes 406 in accordance with an embodiment herein. Usually, the receiver 120 of FIG. 1 is supposed to wake up sufficiently early before the start of a desired MLC 408. According to one embodiment, a signal wave 402 represents a sleeping and waking time of a receiver 120 of FIG. 1 during the reception of a superframe 406. A portion 404 of the wave 402 represents jitter due to clock inaccuracies. Clock inaccuracies may occur in the following manner: the wake up times of the receiver (a receiver from the plurality of receivers 120 of FIG. 1) are adjusted by either one of two types of timers or both: (i) on-chip timer, which may suffer from drift and inaccuracy; and (ii) on-host timer, wherein the chip has no timer and an external clock is responsible for the wake up times, but it has higher inaccuracies. As a result, the receiver 120 could be expecting to wake up at a certain OFDM symbol index; however, it might end up waking at a different symbol index. Furthermore, the receiver 120 would not be able to know whether it is the correct symbol because that symbol (the receiver 120 woke up at) does not contain any indication of its index as shown in FIG. 4. The superframe 406 includes multiple frames (Frames 1-4) and each frame is preceded by overhead information 410 and the desired MLC 408. The superframe 406 comprises 1200 symbols.

Figure 5:
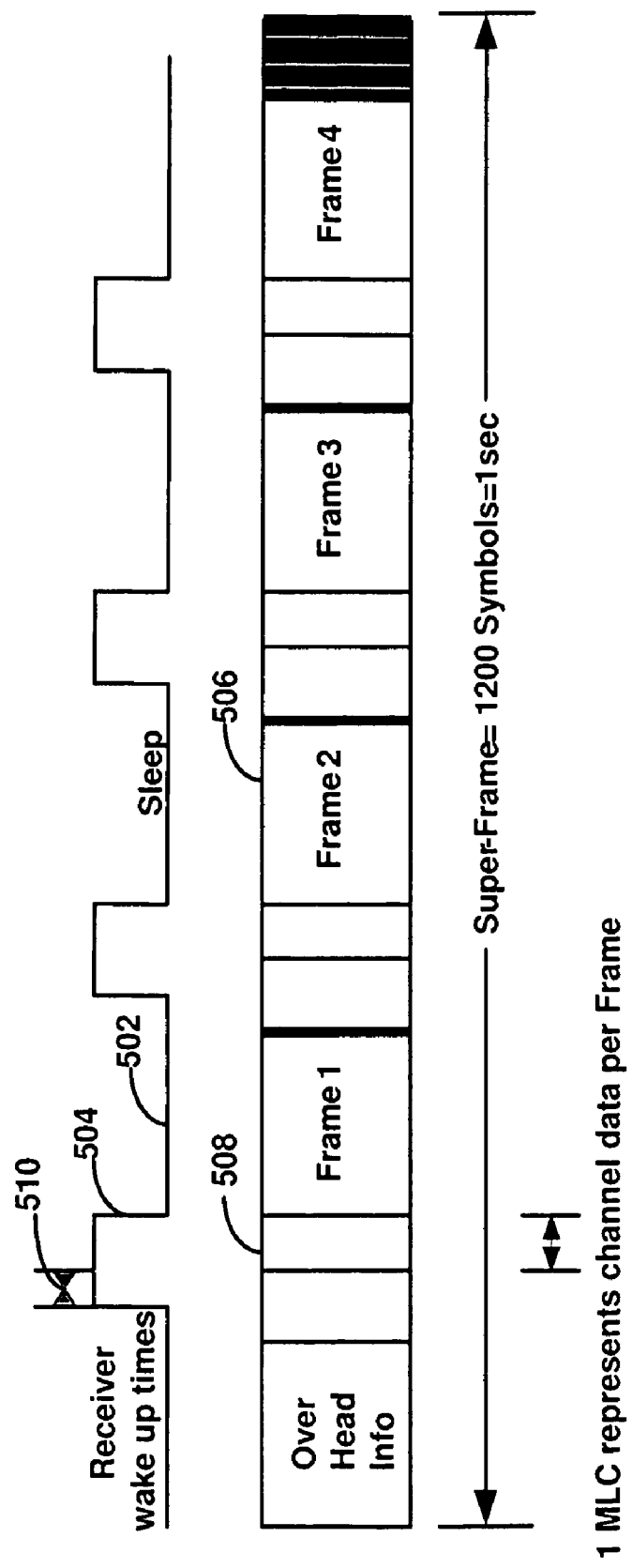
FIG. 5 illustrates a solution to clock inaccuracies in accordance with an embodiment herein.

FIG. 5 illustrates a solution to clock inaccuracies in accordance with an embodiment herein. According to one embodiment, a signal wave 502 represents the sleeping and waking time of the receiver 120 of FIG. 1. A portion 504 of the wave 502 represents waking time of the receiver 120 of FIG. 1 when a required MLC 508 of a superframe 506 is received. A portion 510 of the wave 502 represents a time interval for the waking up of receiver 120 of FIG. 1 early before the start of the desired MLC 508.

According to another embodiment, the time interval 510 includes a maximum error introduced by a timer, time to reacquire a Fast Fourier Transform (FFT) trigger point (start of each OFDM symbol), and the time to reacquire the symbol index. According to another embodiment, the FFT trigger point acquisition is performed by correlating a received symbol with a delayed version of the received symbol followed by determining a moving average over a period of time. The output of this process includes a peak whose index indicates the trigger point.

Figure 6:
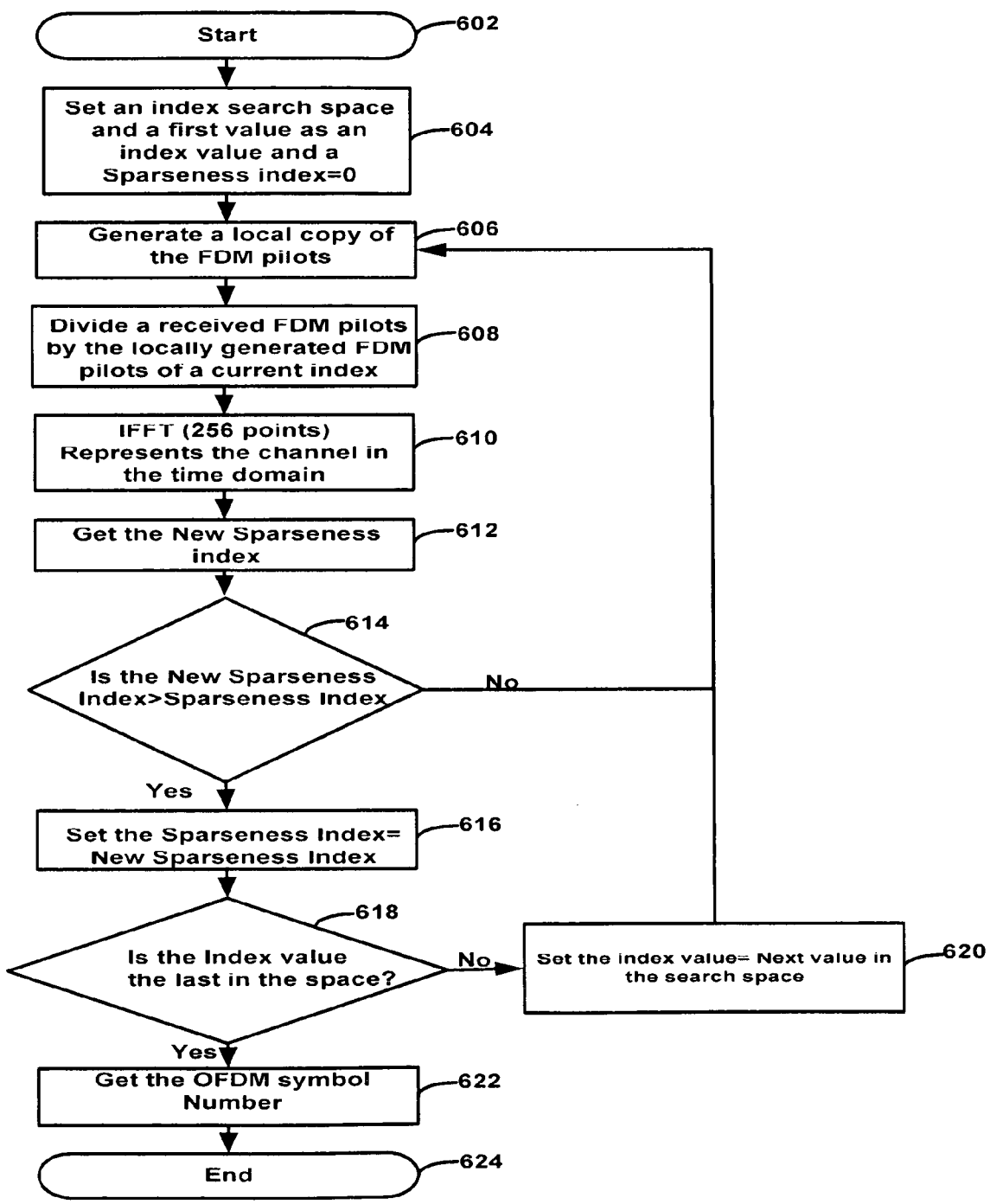
FIG. 6 is a flowchart illustrating a method for reacquiring a symbol index of a received signal in accordance with an embodiment herein.

FIG. 6, with reference to FIGS. 1 through 5, illustrates a flowchart of a method 600 for reacquiring a symbol index of a received signal in accordance with an embodiment herein. The method starts at block 602 and proceeds to block 604 at which point an index search space is set, a sparseness index is set at zero, and a first value in the index search space is set as an index value. In the context of the embodiments herein, the "symbol index" is the order number of the symbol within a superframe; i.e., any number from 1 to 1200. The "index search space" is a defined range of indices representing the deviation from the expected index. The "sparseness index" is the ratio of the peaks' power to the remaining power of a signal.

According to FIG. 3 at least one superframe includes an Overhead Information System (OIS), Multicast Logical Channels (MLC) and multiple Frequency Division Multiple (FDM) pilots. Again with reference to FIG. 6, at step 606, a local copy of the FDM pilots is generated corresponding to a current index value. At step 608, the multiple FDM pilots are divided by the locally generated FDM pilots corresponding to the current index value. This achieves the channel response estimate in the frequency domain. At step 610, an Inverse Fast Fourier Transform (IFFT) process is executed to get the channel response in time domain and then obtain a sparseness index at step 612. The new sparseness index represents the ratio of peaks' power to the remaining power of the signal which represents the channel response in the time domain, which is the output signal of IFFT stage. At step 614, a determination is made as to whether the new sparseness index is greater than the sparseness index. If the new sparseness index is greater (Yes), the method 600 proceeds to step 616. At step 616, the sparseness index is set as the new sparseness index.

At step 618, a determination is made as to whether the current index value is a last value in the index search space. If the current index value is the last value (Yes), the method 600 proceeds to step 622. At step 622, an OFDM symbol number of the current index value is obtained and the method 600 proceeds to step 624. The OFDM symbol number represents the index of a highest sparseness. At step 614, however, if the new sparseness index is not greater than the sparseness index (No), the method 600 proceeds to step 606. At step 618, however, if the current index value is not the last value in the index search space, the method 600 proceeds to step 620. At step 620, the next value in the index search space is set as the index value and the method 600 proceeds to the step 606. At step 624, the method 600 ends. Accordingly, the embodiments herein estimate the actual symbol index at which the receiver 120 wakes up in the presence of sleep timer inaccuracies.

Figure 7:
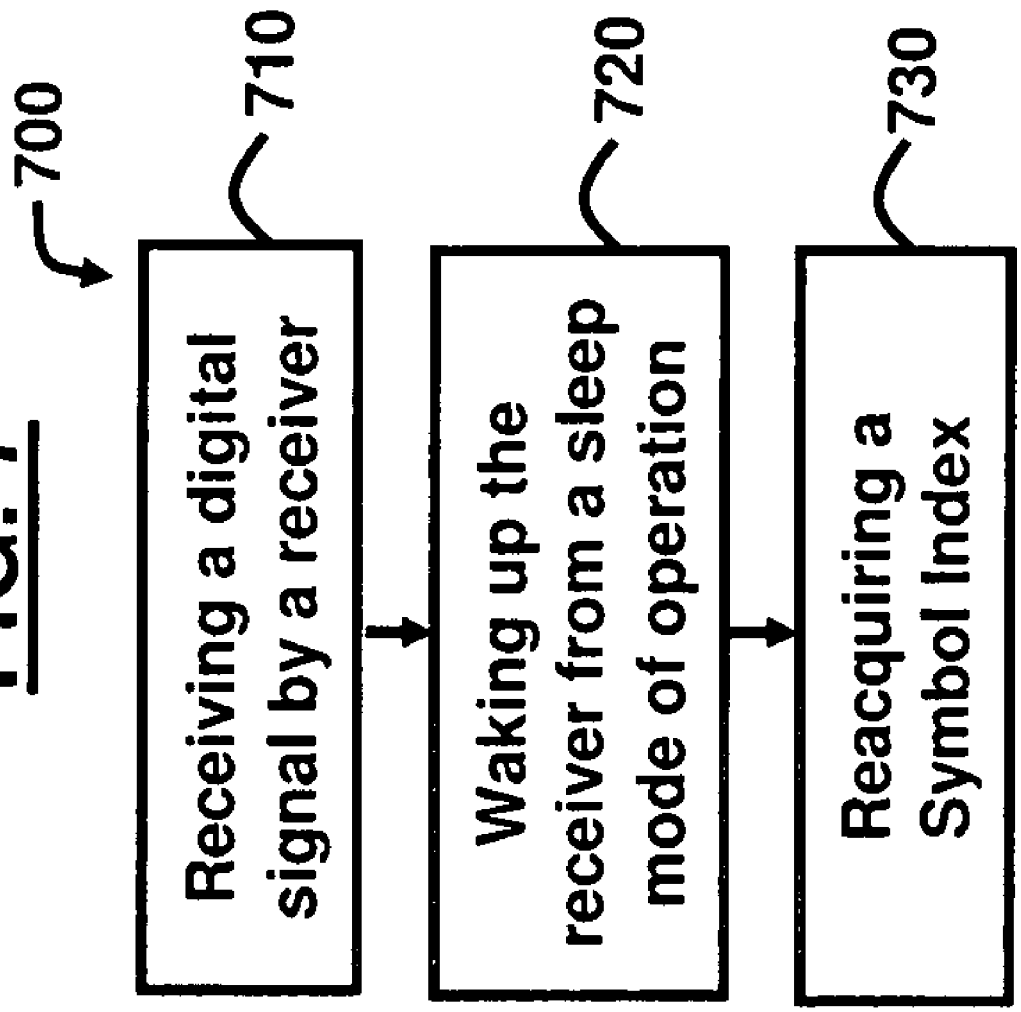
FIG. 7 is a flow diagram illustrating a preferred method according to an embodiment herein.

FIG. 7, with reference to FIGS. 1 through 6, illustrates a flow diagram of a method 700 for re-acquiring a symbol index in a presence of sleep timer errors according to an embodiment herein. The method 700 comprises receiving (710) a digital signal comprising a superframe 300 of FIG. 3 comprising a plurality of Orthogonal Frequency Division Multiplexing (OFDM) symbols in a receiver 120 of FIG. 1 that is in a sleep mode of operation, wherein the receiver 120 of FIG. 1 comprises a timer (not shown); waking up (720) the receiver 120 of FIG. 1 from said sleep mode of operation by an amount of time equal to a maximum error introduced by said timer plus a time to reacquire a beginning of each OFDM symbol plus a time to reacquire a symbol index; and reacquiring (730) the symbol index.

The method may further comprise setting an index search space; setting a first index in the index search space as the symbol index; generating a local copy of FDM pilots that belong to a received symbol depending on the symbol index and whether the OFDM belongs to wide area or local area symbols; dividing the FDM pilots of the received symbol by the local copy of the FDM pilots; computing an IFFT process of the result of the division process to get a time-domain channel estimate; and computing a sparseness index for each the time-domain channel estimate of the plurality of OFDM symbols. Moreover, the method may further comprise determining whether an index value is positioned last in the index search space. Additionally, the method may further comprise setting a second value in the search space as the index value. Also, the method may further comprise obtaining an OFDM symbol number of an index having a maximum sparseness value. Preferably, the OFDM symbol number alerts the receiver to wake up when a MLC arrives in the receiver 120 of FIG. 1. Furthermore, the superframe 300 of FIG. 3 preferably comprises an OIS channel, a MLC, and multiple FDM pilots. Moreover, the plurality of symbols may comprise FDM pilots.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
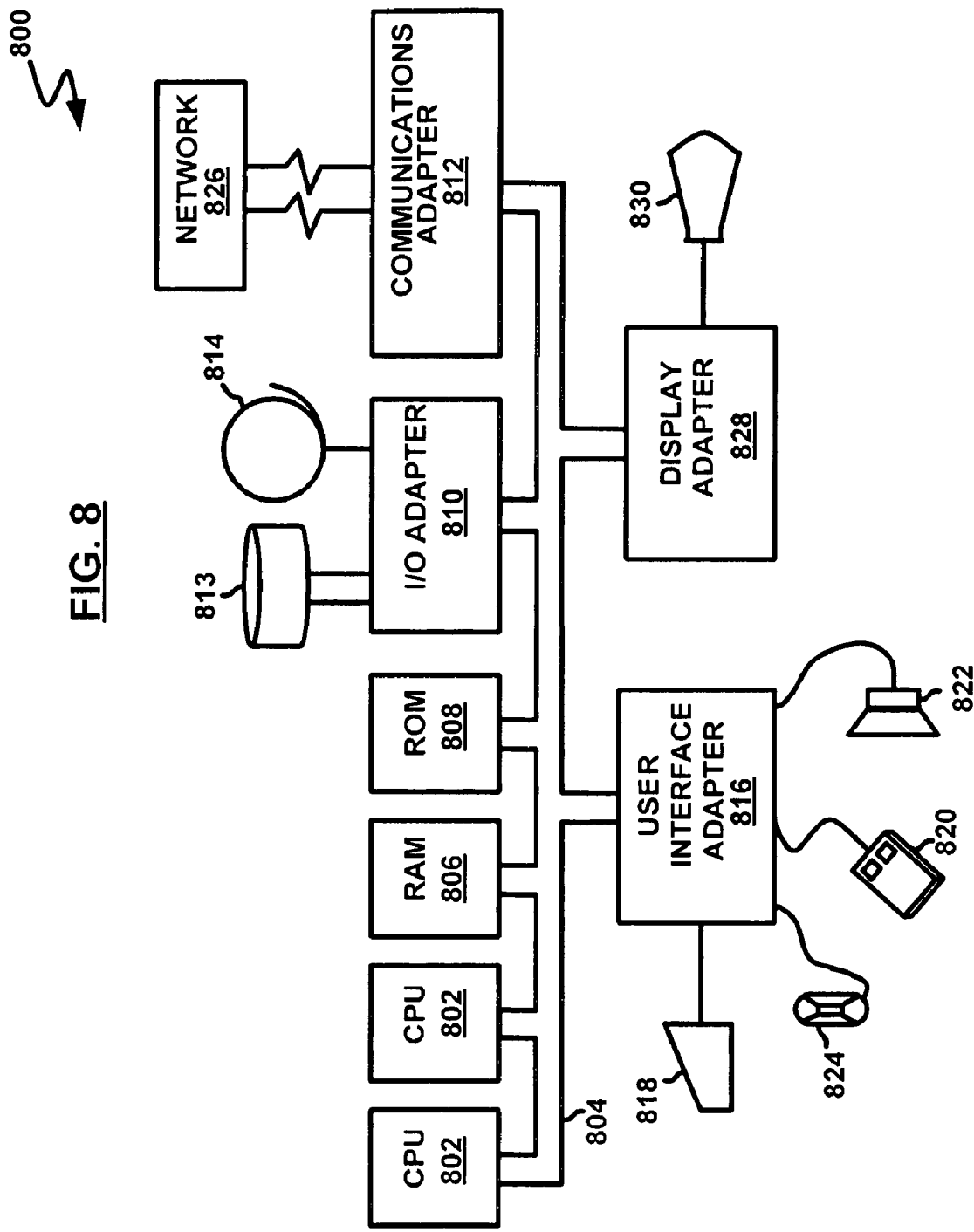
FIG. 8 illustrates a schematic diagram of a computer architecture used in accordance with the embodiments herein.

A representative hardware environment for practicing the embodiments herein is depicted in FIG. 8. This schematic drawing illustrates a hardware configuration of an information handling/computer system 800 in accordance with the embodiments herein. The system 800 comprises at least one processor or central processing unit (CPU) 802. The CPUs 802 are interconnected via system bus 804 to various devices such as a random access memory (RAM) 806, read-only memory (ROM) 808, and an input/output (I/O) adapter 810. The I/O adapter 810 can connect to peripheral devices, such as disk units 813 and tape drives 814, or other program storage devices that are readable by the system 800. The system 800 can read the inventive instructions on the program storage devices and follow these instructions to execute the methodology of the embodiments herein. The system 800 further includes a user interface adapter 816 that connects a keyboard 818, mouse 820, speaker 822, microphone 824, and/or other user interface devices such as a touch screen device (not shown) to the bus 804 to gather user input. Additionally, a communication adapter 812 connects the bus 804 to a data processing network 826, and a display adapter 828 connects the bus 804 to a display device 830 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for re-acquiring a symbol index in a presence of sleep timer errors in a mobile multimedia multicast system, said method comprising:
    receiving a digital signal comprising a superframe comprising a plurality of Orthogonal Frequency Division Multiplexing (OFDM) symbols in a receiver that is in a sleep mode of operation, wherein said receiver comprises a timer;
    waking up said receiver from said sleep mode of operation by an amount of time equal to a maximum error introduced by said timer plus a time to reacquire a beginning of each OFDM symbol plus a time to reacquire the symbol index; and
    reacquiring said symbol index.

2. The method of claim 1, further comprising:
    setting an index search space;
    setting a first index in said index search space as said symbol index;
    generating a local copy of Frequency Division Multiplexing (FDM) pilots that belong to a received symbol depending on said symbol index and whether said OFDM belongs to wide area or local area symbols;

dividing said FDM pilots of said received symbol by said local copy of said FDM pilots;

computing an Inverse Fast Fourier Transform (IFFT) process of the result of the division process to get a time-domain channel estimate; and computing a sparseness index for each said time-domain channel estimate of said plurality of OFDM symbols.

3. The method of claim 2, further comprising determining whether an index value is positioned last in said index search space.

4. The method of claim 3, further comprising setting a second value in said search space as said index value.

5. The method of claim 2, further comprising obtaining an OFDM symbol number of an index having a maximum sparseness value.

6. The method of claim 5, wherein said OFDM symbol number alerts said receiver to wake up when a required Multicast Logical Channel (MLC) arrives in said receiver.

7. The method of claim 1, wherein said superframe comprises an Overhead Information System (OIS) channel, a Multicast Logical Channel (MLC), and multiple Frequency Division Multiplexing (FDM) pilots.

8. The method of claim 1, wherein said plurality of symbols comprises Frequency Division Multiplexing (FDM) pilots.

9. An apparatus for re-acquiring a symbol index in a presence of sleep timer errors in a mobile multimedia multicast system, said apparatus comprising:

a receiver that is in a sleep mode of operation and adapted to receive a digital signal comprising a superframe comprising a plurality of Orthogonal Frequency Division Multiplexing (OFDM) symbols, wherein said receiver comprises a timer;

a processor adapted to (i) wake up said receiver from said sleep mode of operation by an amount of time equal to a maximum error introduced by said timer plus a time to reacquire a beginning of each OFDM symbol plus a time to reacquire the symbol index; and (ii) reacquire said symbol index.

10. The apparatus of claim 9, wherein said processor is further adapted to:

set an index search space;

set a first index in said index search space as said symbol index;

generate a local copy of Frequency Division Multiplexing (FDM) pilots that belong to a received symbol depending on said symbol index and whether said OFDM belongs to wide area or local area symbols;

divide said FDM pilots of said received symbol by said local copy of said FDM pilots;

compute an Inverse Fast Fourier Transform (IFFT) process of the result of the division process to get a time-domain channel estimate; and compute a sparseness index for each said time-domain channel estimate of said plurality of OFDM symbols.

11. The apparatus of claim 10, wherein said processor is further adapted to determine whether an index value is positioned last in said index search space.

12. The apparatus of claim 11, wherein said processor is further adapted to set a second value in said search space as said index value.

13. The apparatus of claim 10, wherein said receiver is further adapted to obtain an OFDM symbol number of an index having a maximum sparseness value.

14. The apparatus of claim 13, wherein said OFDM symbol number alerts said receiver to wake up when a required Multicast Logical Channel (MLC) arrives in said receiver.

15. The apparatus of claim 9, wherein said superframe comprises an Overhead Information System (OIS) channel, a Multicast Logical Channel (MLC), and multiple Frequency Division Multiplexing (FDM) pilots.

16. The apparatus of claim 9, wherein said plurality of symbols comprises Frequency Division Multiplexing (FDM) pilots.

17. A non-transitory program storage device readable by computer, tangibly embodying a program of instructions that, when executed by said computer, cause the computer to perform a method for re-acquiring a symbol index in a presence of sleep timer errors in a mobile multimedia multicast system, said method comprising:

receiving a digital signal comprising a superframe comprising a plurality of Orthogonal Frequency Division Multiplexing (OFDM) symbols in a receiver that is in a sleep mode of operation, wherein said receiver comprises a timer;

waking up said receiver from said sleep mode of operation by an amount of time equal to a maximum error introduced by said timer plus a time to reacquire a beginning of each OFDM symbol plus a time to reacquire the symbol index; and reacquiring said symbol index.

18. The program storage device of claim 17, wherein said method further comprises:

setting an index search space;

setting a first index in said index search space as said symbol index;

generating a local copy of Frequency Division Multiplexing (FDM) pilots that belong to a received symbol depending on said symbol index and whether said OFDM belongs to wide area or local area symbols;

dividing said FDM pilots of said received symbol by said local copy of said FDM pilots;

computing an Inverse Fast Fourier Transform (IFFT) process of the result of the division process to get a time-domain channel estimate; and computing a sparseness index for each said time-domain channel estimate of said plurality of OFDM symbols.

19. The program storage device of claim 18, wherein said method further comprises:

determining whether an index value is positioned last in said index search space;

setting a second value in said search space as said index value; and obtaining an OFDM symbol number of an index having a maximum sparseness value.

20. The program storage device of claim 18, wherein said method further comprises obtaining an OFDM symbol number of an index having a maximum sparseness value, wherein said OFDM symbol number alerts said receiver to wake up when a required Multicast Logical Channel (MLC) arrives in said receiver.

* * * * *